US009948219B2

(12) United States Patent
Saha et al.

(10) Patent No.: US 9,948,219 B2
(45) Date of Patent: Apr. 17, 2018

(54) ROTATING ELECTRICAL MACHINE CONTROL DEVICE

(71) Applicant: AISIN AW CO., LTD., Anjo-shi, Aichi-ken (JP)

(72) Inventors: Subrata Saha, Anjo (JP); Yutaka Hotta, Chiryu (JP); Yasushi Nakamura, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/527,610

(22) PCT Filed: Dec. 17, 2015

(86) PCT No.: PCT/JP2015/085346
§ 371 (c)(1),
(2) Date: May 17, 2017

(87) PCT Pub. No.: WO2016/104318
PCT Pub. Date: Jun. 30, 2016

(65) Prior Publication Data
US 2017/0331400 A1 Nov. 16, 2017

(30) Foreign Application Priority Data

Dec. 25, 2014 (JP) .................................. 2014-262935

(51) Int. Cl.
*H02P 1/00* (2006.01)
*H02P 6/12* (2006.01)
*H02P 6/14* (2016.01)

(52) U.S. Cl.
CPC . *H02P 6/12* (2013.01); *H02P 6/14* (2013.01)

(58) Field of Classification Search
CPC ...... B60W 10/24; B60W 10/26; B60W 20/13; Y02T 10/7038; Y02T 10/7005; Y02T 10/7077
(Continued)

(56) References Cited

U.S. PATENT DOCUMENTS 7,000,601 B2 * 2/2006 Yasui ...................... F02B 33/32
123/559.3
8,538,616 B2 * 9/2013 Yamamoto ............ B60W 20/13
701/22
(Continued)

FOREIGN PATENT DOCUMENTS

JP     2005-033932 A    2/2005
JP     2011-055582 A    3/2011
(Continued)

OTHER PUBLICATIONS

Mar. 15, 2016 International Search Report issued in International Patent Application No. PCT/JP2015/085346.

*Primary Examiner* — Rina Duda
(74) *Attorney, Agent, or Firm* — Oliff PLC

(57) ABSTRACT

A rotating electrical machine control device where the changeover control circuit switches the source of electric power for the electronic control unit when the electric power that is supplied from the second DC power supply to the electronic control unit becomes equal to or lower than a predetermined first reference value and electric power that is output from the backup power supply is equal to or higher than a predetermined second reference value, and the electronic control unit uses the electric power supplied from the backup power supply to cause the inverter to perform the switching operation to perform fail-safe control.

8 Claims, 8 Drawing Sheets

(58) Field of Classification Search
USPC .................. 318/563, 139, 798, 800, 801
See application file for complete search history.

(56) References Cited

U.S. PATENT DOCUMENTS

| | | | |
|---|---|---|---|
| 8,571,734 B2* | 10/2013 | Yamamoto | B60L 3/0092 180/65.285 |
| 2011/0050136 A1 | 3/2011 | Sumi et al. | |
| 2012/0013184 A1* | 1/2012 | Kato | B60K 6/365 307/9.1 |
| 2012/0049771 A1* | 3/2012 | Komatsu | B60K 6/365 318/139 |

FOREIGN PATENT DOCUMENTS

| JP | 2014-158399 A | 8/2014 |
|---|---|---|
| JP | 2015-159684 A | 9/2015 |

* cited by examiner

ROTATING ELECTRICAL MACHINE CONTROL DEVICE

BACKGROUND

The present disclosure relates to rotating electrical machine control devices that drivingly control an alternating current (AC) rotating electrical machine.

For example, in electric vehicles, hybrid vehicles, etc., an inverter that converts electric power between a direct current (DC) and an alternating current (AC) is disposed between an AC rotating electrical machine that drives wheels and a high voltage DC power supply. In many cases, switching of the inverter is controlled by an inverter control device that operates with electric power supplied from a low voltage DC power supply that outputs a lower voltage than the high voltage DC power supply. In some cases, a switch device (contactor) is disposed between the high voltage DC power supply and the inverter. When the contacts of the contactor are closed, the contactor is conductive, so that the high voltage DC power supply and the inverter (and the rotating electrical machine) are electrically connected to each other. When the contacts are open, the contactor is non-conductive, so that the high voltage DC power supply and the inverter (and the rotating electrical machine) are electrically disconnected from each other.

If an overcurrent, an overvoltage, etc. occurs in the inverter, the inverter control device performs fail-safe control to cause the inverter to perform a switching operation. For example, the inverter control device performs active short-circuit control (zero vector sequence control (ZVS control)) in which some of switching elements are turned on so that a current circulates between the rotating electrical machine and the inverter. For example, Japanese Patent Application Publication No. 2011-55582 (JP 2011-55582 A) discloses a control method in which all of switching elements in the upper stage of the inverter are turned off and one or more of switching elements in the lower stage of the inverter are turned on (Japanese Patent Application Publication No. 2011-55582: FIG. 2, paragraphs 158, 159, 165, etc.).

However, there is a case where the low voltage DC power supply stops and wire disconnection, opening of a connector such as a relay, short-circuit, etc. occurs in connection between the low voltage DC power supply and the inverter control device. In such a case, it may not be possible to cause the inverter to appropriately perform the above fail-safe operation.

SUMMARY

According to an exemplary aspect of the disclosure, even if supply of electric power from a power supply to an inverter control device is cut off, fail-safe control can be performed on a rotating electrical machine drive device including an inverter so that the inverter is caused to appropriately perform a switching operation.

In view of the above, according to an exemplary aspect, a rotating electrical machine control device that drivingly controls an AC rotating electrical machine drivingly coupled to wheels of a vehicle, includes an electronic control unit, which controls a rotating electrical machine drive device that includes an inverter that is connected to a first DC power supply and also connected to the rotating electrical machine to convert electric power between a direct current of the first DC power supply and an alternating current of a plurality of phases of the rotating electrical machine, and which operates with electric power supplied from a second DC power supply different from the first DC power supply; a DC link capacitor that smoothes a DC link voltage, the DC link voltage being a voltage on a DC side of the inverter, wherein the inverter and the DC link capacitor are connected to the first DC power supply through a contactor that cuts off supply of electric power when in an open state, in the inverter, an arm corresponding to a single phase of the alternating current is formed by a series circuit of an upper stage switching element and a lower stage switching element, and the inverter includes freewheeling diodes that are connected in parallel with the respective switching elements so that a direction from a lower stage toward an upper stage is a forward direction, and the electronic control unit causes the switching elements of the inverter to perform a switching operation; a backup power supply that uses the first DC power supply as a power source for the backup power supply; and a changeover control circuit that switches a source of electric power for the electronic control unit to the backup power supply, wherein the changeover control circuit switches the source of electric power for the electronic control unit when the electric power that is supplied from the second DC power supply to the electronic control unit becomes equal to or lower than a predetermined first reference value and electric power that is output from the backup power supply is equal to or higher than a predetermined second reference value, and the electronic control unit uses the electric power supplied from the backup power supply to cause the inverter to perform the switching operation to perform fail-safe control.

The backup power supply uses as its power source the first DC power supply that is a different power supply from the second DC power supply. Accordingly, even if disconnection etc. occurs in any wire in the second DC power supply or in any wire around the second DC power supply, electric power can be supplied to the electronic control unit regardless of such a condition. Therefore, even if power supply from the second DC power supply to the electronic control unit is cut off, the electronic control unit can perform the fail-safe control to cause the inverter to perform a fail-safe operation (switching operation). For example, in a configuration in which the electronic control unit cannot perform the fail-safe control when power supply from the second DC power supply is cut off, a fail-safe circuit may need to be separately provided in order to cause the inverter to perform a fail-safe operation (switching operation) in place of the electronic control unit. According to the above configuration, however, the electronic control unit can cause the inverter to perform a fail-safe operation (switching operation) without providing such a fail-safe circuit. That is, according to above configuration, even if power supply from the power source to the electronic control unit is cut off, the fail-safe control can be performed on the rotating electrical machine drive device including the inverter to cause the inverter to appropriately perform a switching operation.

BRIEF DESCRIPTION OF THE DRAWINGS

Further features and advantages of the rotating electrical machine control device will be apparent from the following description of embodiments which is given with reference to the accompanying drawings.

DETAILED DESCRIPTION OF EMBODIMENTS

Figure 1:
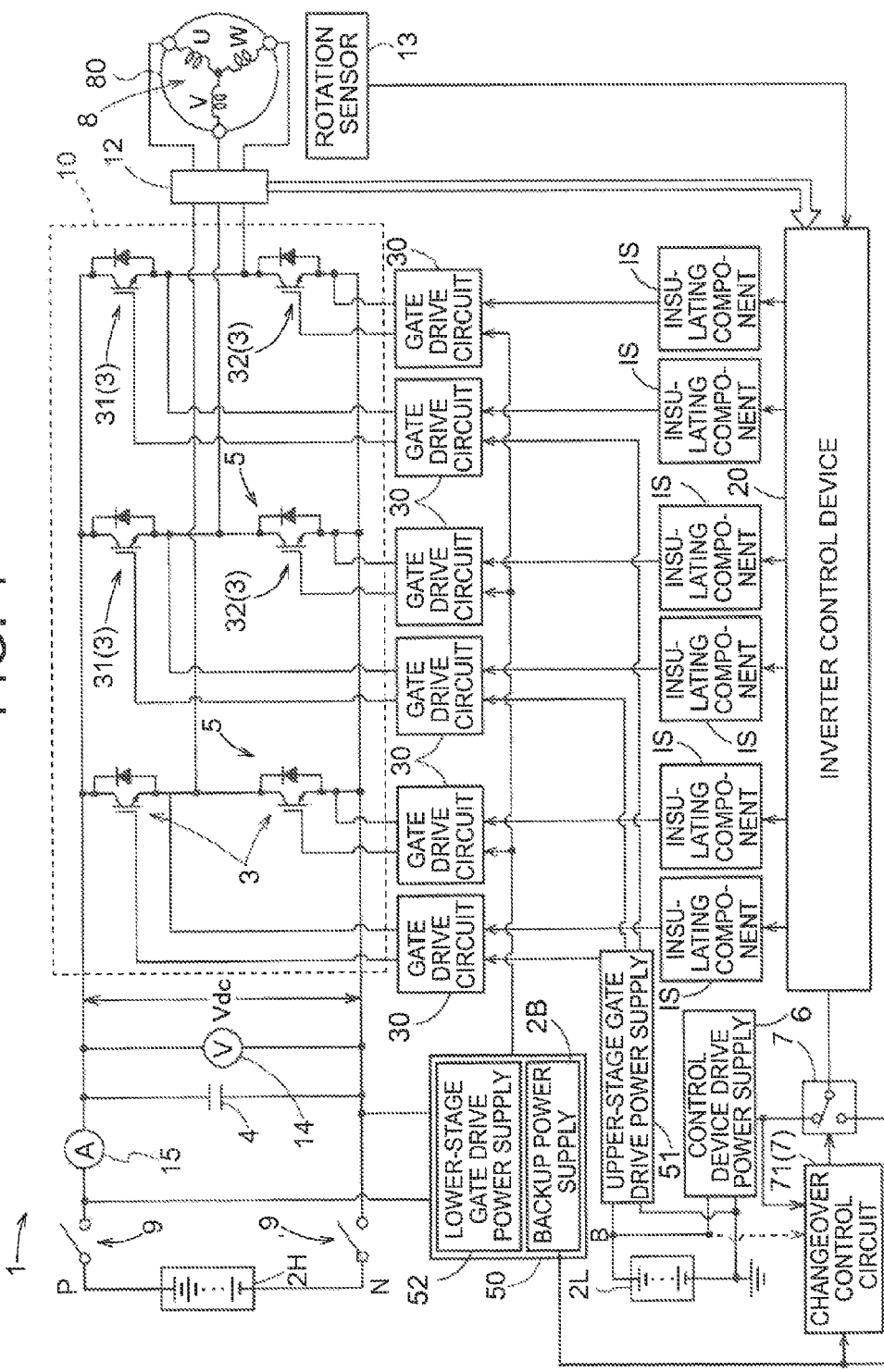
FIG. 1 is a circuit block diagram schematically showing the system configuration of a rotating electrical machine control device.

A rotating electrical machine control device according to an embodiment will be described below based on the accompanying drawings. As shown in FIG. 1, a rotating electrical machine control device 1 includes an inverter control device 20 (i.e., an electronic control unit) that controls a rotating electrical machine drive device including an inverter 10. The inverter 10 is a power conversion device that is connected to a high voltage battery 2H (high voltage DC power supply) serving as a first DC power supply and is connected to a rotating electrical machine 80 to convert electric power between a direct current of the high voltage battery 2H and a multi-phase alternating current (in this example, a three-phase alternating current) of the rotating electrical machine 80. In the present embodiment, the inverter 10 is connected to the high voltage battery 2H via contactors 9. The inverter control device 20 is connected to a low voltage battery 2L (low voltage DC power supply) different from the high voltage battery 2H and serving as a second DC power supply, and operates with electric power supplied from the low voltage battery 2L. A power supply voltage of the high voltage battery 2H (first DC power supply) is, e.g., about 200 to 400 [V], and a power supply voltage of the low voltage battery 2L (second DC power supply) is, e.g., about 12 to 24 [V]. In the present embodiment, the second DC power supply is a DC power supply whose power supply voltage is lower than that of the first DC power supply.

The inverter control device 20 causes switching elements 3 of the inverter 10 to perform a switching operation, and if an undesirable event such as an overcurrent or an overvoltage occurs in the rotating electrical machine drive device (the inverter 10 and an electrical system around the inverter 10), performs fail-safe control to cause the inverter 10 to perform a fail-safe operation (switching operation). In the present embodiment, the inverter control device 20 selectively performs, as the fail-safe control, active short-circuit control and shutdown control to cause the inverter 10 to perform a fail-safe operation (switching operation).

In the present embodiment, the rotating electrical machine 80 is, e.g., a rotating electrical machine serving as a driving force source for a vehicle such as a hybrid vehicle or an electric vehicle. The rotating electrical machine 80 serving as a driving force source for wheels of the vehicle is a rotating electrical machine that operates with a multi-phase alternating current (in this example, a three-phase alternating current), and can function as both an electric motor and an electric generator. That is, the rotating electrical machine 80 converts electric power from the high voltage battery 2H to power via the inverter 10 (power running). Alternatively, the rotating electrical machine 80 converts a rotational driving force transmitted from an internal combustion engine 70 described below with reference to FIG. 2 and wheels W to electric power to charge the high voltage battery 2H via the inverter 10 (regeneration).

Figure 2:
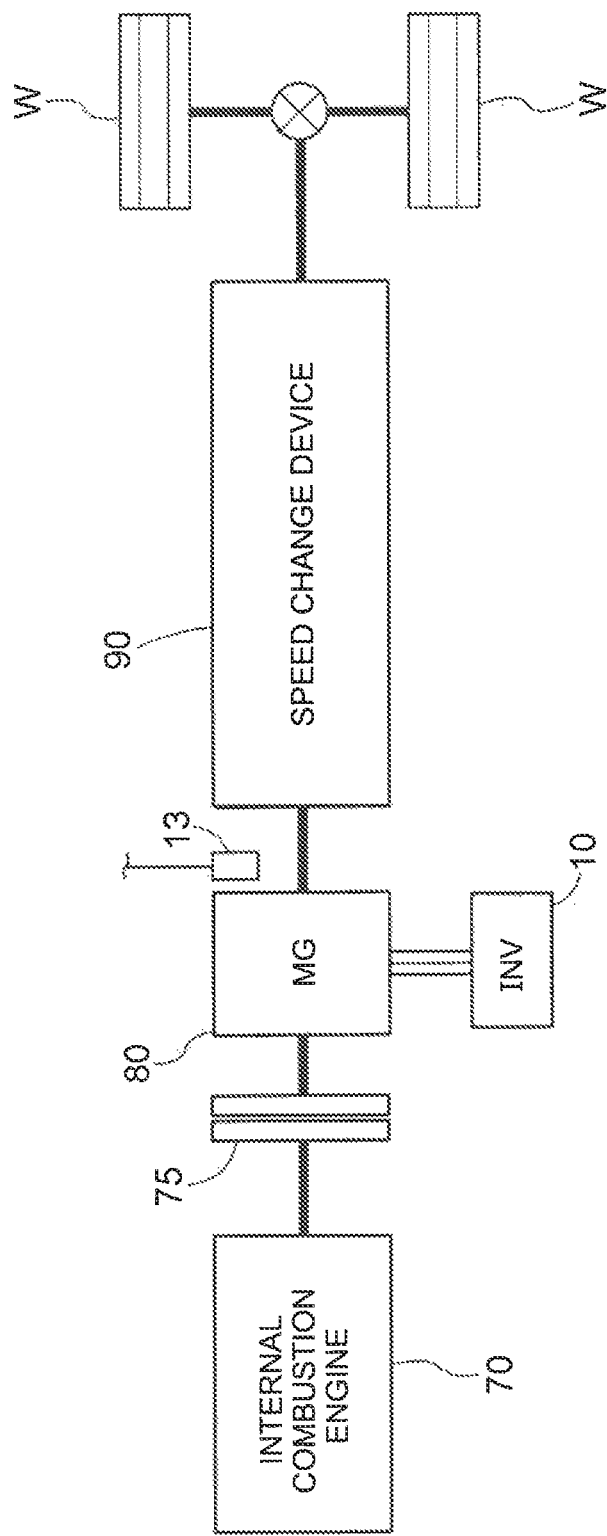
FIG. 2 is a block diagram schematically showing the configuration of a drive device for a vehicle.

As shown in the schematic view of FIG. 2, the rotating electrical machine 80 of the present embodiment is a rotating electrical machine (MG: Motor/Generator) serving as a driving force source for a hybrid vehicle. The present embodiment shows by way of example a vehicle equipped with what is called a parallel hybrid drive device. This hybrid drive device includes the internal combustion engine 70 and the rotating electrical machine 80 as driving force sources for the vehicle. The internal combustion engine 70 is a heat engine that is driven by combustion of fuel. For example, various known internal combustion engines such as a gasoline engine and a diesel engine can be used as the internal combustion engine 70. The internal combustion engine 70 and the rotating electrical machine 80 are drivingly coupled via an internal combustion engine disconnection clutch 75.

The hybrid drive device includes a speed change device 90. The speed change device 90 is a stepped automatic speed change device having a plurality of shift speeds with different speed ratios. For example, the speed change device 90 includes a gear mechanism such as a planetary gear mechanism and a plurality of engagement devices (such as clutches and brakes) in order to establish a plurality of shift speeds. An input shaft of the speed change device 90 is drivingly coupled to an output shaft (e.g., a rotor shaft) of the rotating electrical machine 80. The rotational speed and torque of the internal combustion engine 70 and the rotating electrical machine 80 are transmitted to the input shaft of the speed change device 90. The speed change device 90 shifts the rotational speed transmitted to the speed change device 90 at the speed ratio of each shift speed and converts the torque transmitted to the speed change device 90 to transmit the resultant rotational speed and torque to an output shaft of the speed change device 90. The output shaft of the speed change device 90 is distributed to two axles via, e.g., a differential gear (output differential gear unit) etc. and is transmitted to the wheels W drivingly coupled to the respective axles. As used herein, the speed ratio refers to the ratio of the rotational speed of the input shaft to the rotational speed of the output shaft (=the rotational speed of the input shaft/the rotational speed of the output shaft) in the case where each shift speed is established in the speed change device 90. The torque obtained by multiplying the torque transmitted to the speed change device 90 through the input shaft thereof by the speed ratio corresponds to the torque to be transmitted to the output shaft.

As used herein, the expression "drivingly coupled" refers to the state where two rotary elements are coupled together so that they can transmit a driving force therebetween. Specifically, the expression "drivingly coupled" includes the state where the two rotary elements are coupled together so as to rotate together or the state where the two rotary elements are coupled together via one or more transmission members so that they can transmit a driving force therebetween. Such transmission members include various members that transmit rotation at the same speed or a shifted speed and include, e.g., a shaft, a gear mechanism, a belt, a chain, etc. Such transmission members may include an engagement device that selectively transmits rotation and a driving force, such as, e.g., a friction engagement device and a meshing engagement device. Accordingly, the rotating electrical machine 80 can be said to be drivingly coupled to the wheels W. A starter device that starts the internal combustion engine 70, various oil pumps (electric and mechanical), a control device for the speed change device 90, etc. are not shown in FIG. 2.

Referring back to FIG. 1, the system configuration of the rotating electrical machine control device 1 will be described. For example, the high voltage battery 2H serving as a power source that drives the rotating electrical machine 80 is a secondary battery (battery) such as a nickel-hydrogen battery or a lithium-ion battery, an electric double-layer capacitor, etc. The high voltage battery 2H that supplies electric power to the rotating electrical machine 80 is a high voltage, high capacity DC power supply. A rated power supply voltage of the high voltage battery 2H is, e.g., 200 to 400 [V].

Since the rotating electrical machine 80 is an AC rotating electrical machine, the inverter 10 that converts electric power between direct current and alternating current (in this example, three-phase alternating current) is disposed between the high voltage battery 2H and the rotating electrical machine 80, as described above. A voltage across positive and negative electrodes on the DC side of the inverter 10 is hereinafter referred to as the "DC link voltage Vdc." The high voltage battery 2H can supply electric power to the rotating electrical machine 80 via the inverter 10 and can also store electric power produced by power generation of the rotating electrical machine 80. A smoothing capacitor (DC link capacitor 4) that smoothes the DC link voltage Vdc is disposed on the DC side of the inverter 10. The DC link capacitor 4 stabilizes the DC voltage (PC link voltage Vdc) that varies according to fluctuations in power consumption of the rotating electrical machine 80.

The contactors 9 are disposed on the inverter 10 side of the high voltage battery 2H. That is, the inverter 10 and the DC link capacitor 4 are connected to the high voltage battery 2H via the contactors 9 that cut off supply of electric power when in an open state as described later. The contactors 9 can electrically disconnect an electric circuit system (the DC link capacitor 4, the inverter 10) of the rotating electrical machine drive device and the high voltage battery 2H from each other.

In the present embodiment, the contactors 9 are mechanical relays that open and close based on a command from a vehicle control unit (not shown) that is one of the host control devices for the vehicle, and for example, are referred to as the system main relays (SMRs). When an ignition key (IG key) of the vehicle is on (in an enabled state), the contacts of the SMRs are closed to attain a conductive state (connected state). When the IG key is off (in a disabled state), the contacts of the SMRs are opened to attain a nonconductive state (disconnected state). When the contactors 9 are in the connected stat (closed state), the high voltage battery 2H and the inverter 10 (and the rotating electrical machine 80) are electrically connected to each other. When the contactors 9 are in the disconnected state (open state), the high voltage battery 2H and the inverter 10 (and the rotating electrical machine 80) are electrically disconnected from each other.

As described above, the inverter 10 converts DC power having the DC link voltage Vdc to AC power of a plurality of phases (n phases, where n is a natural number, and in this example, three phases) to supply the AC power to the rotating electrical machine 80. The inverter 10 also converts AC power generated by the rotating electrical machine 80 to DC power to supply the DC power to the DC power supply. The inverter 10 has a plurality of switching elements 3. It is preferable to use power semiconductor elements that can operate at high frequencies, such as insulated gate bipolar transistors (IGBTs), power metal oxide semiconductor field effect transistors (MOSFETs), silicon carbide-metal oxide semiconductor FETs (SiC-MOSFETs), SiC-static induction transistors (SiC-SITs), or gallium nitride-MOSFETs (GaN-MOSFETs), as the switching elements 3. As shown in FIG. 1, in the present embodiment, IGBTs are used as the switching elements 3.

As well known in the art, the inverter 10 is formed by a bridge circuit having the number of arms corresponding to the number of the plurality of phases. In the inverter 10, the arm corresponding to a single phase of the alternating current is formed by a series circuit of an upper stage switching element 31 and a lower stage switching element 32. Specifically, as shown in FIG. 1, two switching elements 3 are connected in series between the DC positive electrode side and the DC negative electrode side of the inverter 10 to form a single arm. In the case of the three-phase AC, three (three phases) of the series circuits (three of the arms) are connected in parallel. That is, the bridge circuit is formed which has the three series circuits (arms) corresponding to stator coils 8 for the U-phase, V-phase, and W-phase of the rotating electrical machine 80.

An intermediate point in the series circuit (arm) of the pair of switching elements 3 of each phase, i.e., the connection point between the switching element 3 on the positive electrode side (the upper stage switching element 31) and the switching element 3 on the negative electrode side (the lower stage switching element 32), is connected to a corresponding one of the three-phase stator coils 8 of the rotating electrical machine 80. Diodes 5 (freewheeling diodes) are connected in parallel with the respective switching elements 3 so that the direction from the negative electrode toward the positive electrode (the direction from the lower stage toward the upper stage) is a forward direction.

As shown in FIG. 1, the inverter 10 is controlled by the inverter control device 20. The inverter control device 20 is formed by using a processor such as a microcomputer or a digital signal processor (DSP) as a core member. An operating voltage of the microcomputer, the DSP, etc. is typically 3.3 [V] or 5 [V]. Accordingly, electric power is supplied from the low voltage battery 2L (positive electrode B to ground: 12 to 24 [V]) to the inverter control device 20 via a power supply circuit (control device drive power supply 6) formed by a regulator circuit etc.

The inverter control device 20 controls the rotating electrical machine 80 via the inverter 10 by performing current feedback control using a vector control method based on target torque TM of the rotating electrical machine 80 which is received as a request signal from other control device etc., such as the vehicle control unit that controls traveling of the vehicle, via a controller area network (CAN) etc. Specifically, the inverter control device 20 generates drive signals (switching control signals) that drive the switching elements 3 of the inverter 10. In the case where the switching elements 3 are IGBTs or FETs, their control terminals are gate terminals. In the present embodiment, drive signals that are applied to the control terminals are therefore referred to as the gate drive signals (switching control signals).

Actual currents flowing through the stator coils 8 of the respective phases of the rotating electrical machine 80 are detected by a current sensor 12, and the inverter control device 20 obtains the detection result. The positions of magnetic poles of a rotor of the rotating electrical machine 80 at each time are detected by a rotation sensor 13 such as a resolver, and the inverter control device 20 obtains the detection result. The inverter control device 20 performs the current feedback control by using the detection results of the current sensor 12 and the rotation sensor 13. The inverter control device 20 has various functional units for the current feedback control, and each functional unit is implemented by cooperation between hardware such as the microcomputer or the DSP and software (program). Since the current feedback control is known in the art, detailed description thereof will be omitted.

The control terminals of the switching elements 3 (e.g., the gate terminals of the IGBTs) of the inverter 10 are connected to the inverter control device 20 via gate drive circuits 30 (driver circuits) so that switching of the switching elements 3 is individually controlled. As described above, the inverter control device 20 is a low voltage circuit that is formed by using a microcomputer etc. as a core and that is supplied with electric power from the low voltage battery 2L. The inverter 10 is a high voltage circuit that is connected to the high voltage battery 2H and that operates at high voltages. Drive signals (gate drive signals) having an amplitude of about 12 to 18 [V] typically need to be applied to the control terminals (e.g., the gate terminals) of the power switching elements of the inverter 10 that belongs to high voltage circuits as in the present embodiment. However, an operating voltage of the inverter control device 20 that generates gate drive signals is less than 12 [V] (e.g., 3.3 [V] to 5 [V]), as described above. Accordingly, gate drive signals having required amplitudes cannot be applied to the inverter 10.

The rotating electrical machine drive device therefore includes the gate drive circuits 30 that enhance switching control signals (e.g. gate drive signals) for the switching elements 3, namely enhance electrical driving capabilities of the switching control signals (e.g., capabilities to operate a circuit in a subsequent stage, such as a voltage amplitude and an output current), and relay the resultant switching control signals. Switching control signals generated by the inverter control device 20, i.e., the low voltage circuit, are supplied via the gate drive circuits 30 to the inverter 10 as switching control signals for the high voltage circuit. In the present embodiment, the low voltage battery 2L and the high voltage battery 2H are insulated from each other and in a floating relationship with each other. That is, since the low voltage circuit and the high voltage circuit are insulated from each other, the gate drive circuits 30 are connected to the inverter control device 20 via, e.g., insulating components IS such as photocouplers or small transformers for signal transmission. Namely, gate drive signals generated in the inverter control device 20 that belongs to low voltage circuits are transmitted from the inverter control device 20 to the gate drive circuits 30 with insulation between the low voltage circuit and the high voltage circuit being maintained by the insulating components IS. Electric driving capabilities of the gate drive signals are enhanced by the gate drive circuits 30, and the switching elements 3 of the inverter 10 that belong to high voltage circuits are drivingly controlled.

The rotating electrical machine control device 1 includes a drive circuit power supply (51, 52) that supplies electric power to the gate drive circuits 30. For example, the drive circuit power supply (51, 52) is formed by a transformer that transmits a signal or energy through electromagnetic coupling between a primary coil and a secondary coil. Accordingly, regardless of whether a power source for the drive circuit power supply (51, 52) is the high voltage battery 2H or the low voltage battery 2L, the drive circuit power supply (51, 52) can supply electric power to the gate drive circuits 30 etc. while maintaining insulation between the low voltage circuit and the high voltage circuit. The present embodiment illustrates an example in which an upper stage gate drive power supply 51 (upper stage drive circuit power supply) that supplies electric power to those gate drive circuits 30 which relay gate drive signals to the upper stage switching elements 31 and a lower stage gate drive power supply 52 (lower stage drive circuit power supply) that supplies electric power to those gate drive circuits 30 which relay gate drive signals to the lower stage switching elements 32 are provided as the drive circuit power supply (51, 52).

If any undesirable event such as overcurrent or overvoltage occurs in the vehicle, the rotating electrical machine 80, the speed change device 90, the inverter 10, etc., and if such an event occurs at least in the rotating electrical machine drive device including the inverter 10, the inverter control device 20 performs fail-safe control to cause the inverter 10 to perform a fail-safe operation in order to limit the operation of the rotating electrical machine 80. Not only when the inverter control device 20 directly obtains detection information but also in response to a request for fail-safe control from other control device such as the vehicle control unit, the inverter control device 20 performs fail-safe control to cause the inverter 10 to perform a fail-safe operation.

For example, shutdown control (SD) is known as the fail-safe control. The shutdown control is the control to inactivate the switching control signals for all the switching elements 3 of the inverter 10 to turn off the inverter 10. All the switching elements 3 of the inverter 10 are turned off by the shutdown control. In this case, the rotor of the rotating electrical machine 80 continues to rotate due to inertia, and a large counter electromotive force is generated. When the rotor is rotating at a high speed, a motor line counter electromotive force (Vbemf) is significantly higher than the DC link voltage Vdc. Electric power generated by rotation of the rotor is rectified through the diodes 5 and passes through the contactors 9 in a closed state to charge the high voltage battery 2H. For example, as shown in the upper waveform chart in FIG. 3, when the shutdown control is started at time tsd, the absolute value of a battery current Ib (current flowing through the high voltage battery 2H) increases significantly. If the battery current Ib becomes larger than the rated current of the high voltage battery 2H, such a battery current Ib causes excessive draining or damage to the high voltage battery 2H. Increasing the rated value of the high voltage battery 2H so that the high voltage battery 2H can endure a large battery current Ib may increase the scale and the cost.

When the contactors 9 are opened, the current flow into the high voltage battery 2H is cut off.

Figure 3:
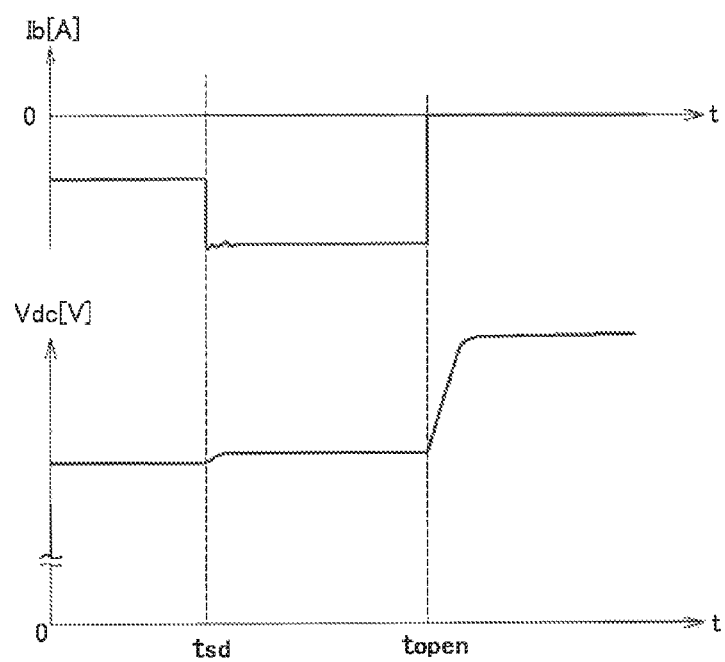
FIG. 3 is a waveform chart schematically showing the responses of a battery current and a DC lick voltage during shutdown and when contactors are open.

As shown in the upper waveform chart in FIG. 3, the battery current Ib thus becomes equal to zero. As the current flow into the high voltage battery 2H is cut off, the current charges the DC link capacitor 4 and increases the DC link voltage Vdc. For example, as shown in the lower waveform chart in FIG. 3, when the contactors 9 are opened at time topen, the DC link voltage Vdc increases rapidly. If the DC link voltage Vdc becomes higher than the rated voltage (absolute maximum rating) of the inverter 10 (the switching elements 3) or the DC link capacitor 4, such a DC link voltage Vdc may damage the inverter 10 (the switching elements 3) or the DC link capacitor 4. Increasing the rated values of the inverter 10 (the switching elements 3) and the DC link capacitor 4 so that the inverter 10 (the switching elements 3) and the DC link capacitor 4 can endure a high voltage may increase the scale and the cost.

It is therefore desired that, if an event such as overcurrent or overvoltage occurs in the rotating electrical machine drive device including the inverter 10, fail-safe control be performed while restraining an excessive increase in battery current Ib for charging the high voltage battery 2H and in DC link voltage Vdc. In the present embodiment, in view of such circumstances, the inverter control device 20 performs effective fail-safe control. That is, the inverter control device 20 causes the inverter 10 to perform an effective fail-safe operation.

The inverter control device 20 selectively performs, as the fail-safe control, shutdown control (SD) and active short-circuit control (ASC). That is, the inverter control device 20 causes the inverter 10 to selectively perform, as the fail-safe operation, a shutdown operation and an active short-circuit operation. As described above, the shutdown control is the control to turn off all the switching elements 3 of the inverter 10. All the switching elements 3 are turned off by the shutdown operation of the inverter 10. The active short-circuit control is the control to circulate a current between the rotating electrical machine 80 and the inverter 10. Specifically, the active short-circuit control is the control to turn on one of the upper stage switching elements 31 of the arms of all the plurality of phases and the lower stage switching elements 32 of the arms of all the plurality of phases and turn off the other. One of the upper stage switching elements 31 of the arms of all the plurality of phases and the lower stage switching elements 32 of the arms of all the plurality of phases is turned on and the other is turned off by the active short-circuit operation of the inverter 10. The upper stage active short-circuit control (upper stage active short-circuit operation) refers to the case where the upper stage switching elements 31 of the arms of all the plurality of phases are turned on and the lower stage switching elements 32 of the arms of all the plurality of phases are turned off. The lower stage active short-circuit control (lower stage active short-circuit operation) refers to the case where the lower stage switching elements 32 of the arms of all the plurality of phases are turned on and the upper stage switching elements 31 of the arms of all the plurality of phases are turned off.

Figure 4:
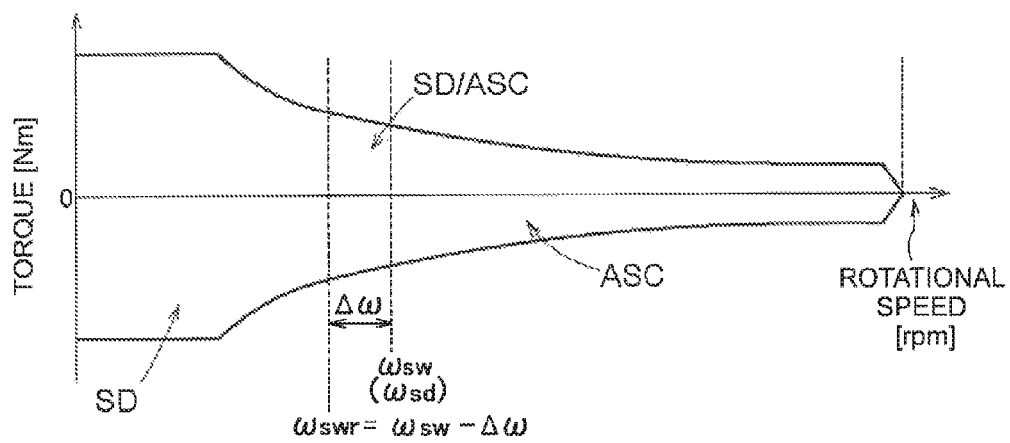
FIG. 4 is a diagram showing the relationship between the rotational speed and fail-safe control.

In the present embodiment, at least according to the rotational speed of the rotating electrical machine 80, the inverter control device 20 performs active short-circuit control (ASC) to cause the inverter 10 to perform an active short-circuit operation (ASC) when in a high rotational speed region, namely when the rotational speed ω of the rotating electrical machine 80 is equal to or higher than a predetermined switching rotational speed $\omega_{sw}$, and performs shutdown control (SD) to cause the inverter 10 to perform a shutdown operation when in a low rotational speed region that is lower in rotational speed than the high rotational speed region. FIG. 4 shows a torque map showing the relationship between the rotational speed ω and the torque of the rotating electrical machine 80, and shows on the torque map the relationship between the rotational speed ω and the fail-safe control. For example, the switching rotational speed $\omega_{sw}$ is the maximum rotational speed (SD maximum rotational speed $\omega_{sd}$) at which shutdown control (shutdown operation) is permitted. As described above, the region where the rotational speed is equal to or higher than the switching rotational speed $\omega_{sw}$ (or the region where the rotational speed is higher than the switching rotational speed $\omega_{sw}$) is the high rotational speed region. The rotational speed region that is lower than the high rotational speed region, namely the region where the rotational speed is lower than the switching rotational speed $\omega_{sw}$ (or the region where the rotational speed is equal to or lower than the switching rotational speed $\omega_{sw}$), is the low rotational speed region. The boundary conditions such as "equal to or higher than, and equal to or lower than" and "higher than, or lower than (less than)" can be set as appropriate, and are not intended to limit the fail-safe control (fail safe operation). The same applies in the case where other boundaries are shown in the following description.

During the shutdown control, the inverter control device 20 switches the control method of the shutdown control according to the rotational speed of the rotating electrical machine 80. Specifically, the inverter control device 20 switches the fail-safe control to the active short-circuit control when the rotational speed ω of the rotating electrical machine 80 increases to the high rotational speed region during the shutdown control (during the shutdown operation of the inverter 10). The inverter control device 20 switches the fail-safe control to the shutdown control when the rotational speed ω of the rotating electrical machine 80 decreases to the low rotational speed region during the active short-circuit control (during the active short-circuit operation of the inverter 10). The switching rotational speed $\omega_{sw}$ can therefore be said to be the speed at which the method of the fail-safe control (the fail-safe operation of the inverter 10) is switched. The value of the switching rotational speed $\omega_{sw}$ may vary depending on the type (method) of fail-safe control before switching. For example, in the present embodiment, when first determining the type (method) of fail-safe control and when switching the fail-safe control to the shutdown control during the active short-circuit control, the fail-safe control is switched based on the above switching rotational speed $\omega_{sw}$. When switching the fail-safe control to the active short-circuit control during the shutdown control, the fail-safe control is switched based on a shift switching rotational speed $\omega_{swr}$ ($=\omega_{sw}-\Delta\omega$) that is lower than the switching rotational speed $\omega_{sw}$ by $\Delta\omega$. That is, the region where the rotational speed is equal to or higher than the switching rotational speed ($\omega_{swr}$) corresponds to the low rotational speed region.

Figure 5:
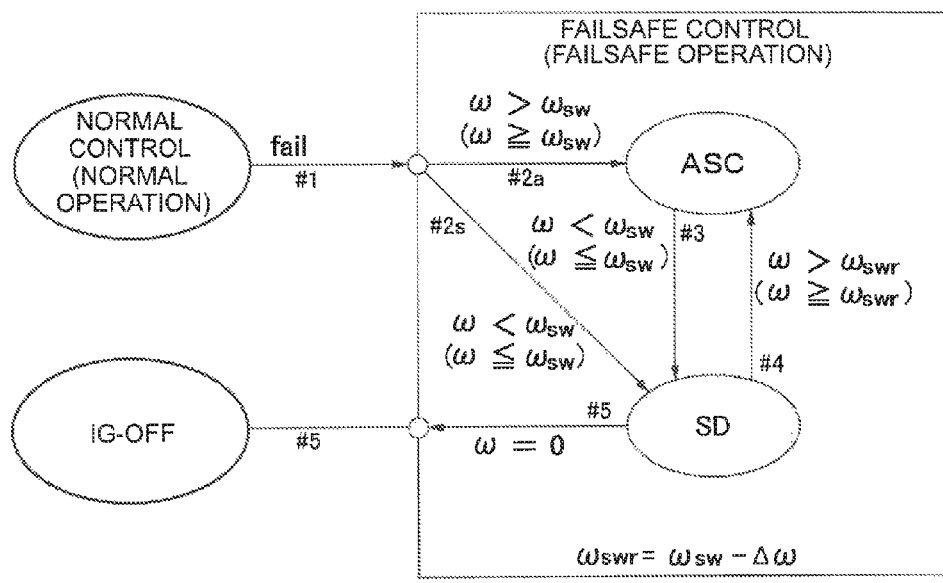
FIG. 5 is a state transition diagram of the fail-safe control.

State transition of the fail-safe control will be described with reference also to the state transition diagram of FIG. 5. Normal control in the figure shows the state (state of normal operation) where an event such as overcurrent or overvoltage has not occurred in the vehicle, the rotating electrical machine 80, the speed change device 90, the inverter 10, etc. and the inverter 10 is operating by normal control. If any undesirable event occurs in the device(s) mentioned above during the normal control, information "fail" indicating that such an event has occurred is transmitted to the inverter control device 20 (#1). In response to the information "fail", the inverter control device 20 determines the type of fail-safe control (determines the type of fail-safe operation to be performed by the inverter 10) based on the rotational speed of the rotating electrical machine 80. When the rotational speed ω is higher than the SD maximum rotational speed $\omega_{sd}$ that is the switching rotational speed $\omega_{sw}$, active short-circuit control (ASC) is selected (#2a). When the rotational speed ω is lower than the switching rotational speed $\omega_{sw}$ (SD maximum rotational speed $\omega_{sd}$), shutdown control (SD) is selected (#2s). That is, when starting the fail-safe control, the rotational speed region higher than the switching rotational speed $\omega_{sw}$ (SD maximum rotational speed $\omega_{sd}$) is the high rotational speed region, and the rotational speed region lower than the switching rotational speed $\omega_{sw}$ (SD maximum rotational speed $\omega_{sd}$) is the low rotational speed region.

If the rotational speed $\omega$ becomes lower than the switching rotational speed $\omega_{sw}$ (SD maximum rotational speed $\omega_{sd}$) during the active short-circuit control (ASC), the fail-safe control is switched to the shutdown control (SD) (#3). If the rotational speed $\omega$ becomes higher than the shift switching rotational speed $\omega_{swr}$ that is lower than the switching rotational speed $\omega_{sd}$ by $\Delta\omega$ during the shutdown control (SD), the fail-safe control is switched to the active short-circuit control (ASC) (#4).

In this case, the rotational speed region higher than the shift switching rotational speed $\omega_{swr}$ is the high notational speed region, and the rotational speed region lower than the shift switching rotational speed $\omega_{swr}$ is the low rotational speed region. For example, the rotational speed $\omega$ is expected to increase during the fail-safe control in the case where the rotational speed of the wheels W increases due to the vehicle moving down the slope or steps and this increase in rotational speed is transmitted to the rotating electrical machine 80.

Basically, the rotational speed of the rotating electrical machine 80 gradually decreases when the inverter 10 continues to perform the fail-safe operation. Accordingly, the operation of the inverter 10 is settled to the shutdown operation (SD). When the rotational speed $\omega$ becomes equal to zero during the shutdown operation (SD) of the inverter 10, the inverter control device 20 notifies the vehicle control unit, which is a host control device, of the fact that the rotating electrical machine 80 has stopped safely. The vehicle control unit turns off the ignition key (IG key) of the vehicle (#5: IG-OFF). Alternatively, the vehicle control unit prompts an occupant to operate the ignition key, and the occupant turns off the ignition key.

As described above, if an event such as overcurrent or overvoltage occurs in the vehicle, the rotating electrical machine 80, the speed change device 90, the inverter 10, etc., the inverter control device 20 controls the inverter 10 so that the inverter 10 performs a fail-safe operation (fail-safe control). Causes of such an event include a vehicle collision etc. If a vehicle collision occurs, the impact from the collision may cause an open circuit in the vehicle. At this time, if the low voltage battery 2L fails or any wire between the low voltage battery 2L and the inverter control device 20 is disconnected, the inverter control device 20 can no longer control the inverter 10. That is, the inverter control device 20 may not be able to perform the fail-safe control even if an overcurrent, an overvoltage, etc. occurs in the rotating electrical machine drive device etc.

As shown in FIG. 1, in the present embodiment, a backup power supply 2B using the high voltage battery 2H as its power source is included so that electric power can be supplied to the inverter control device 20 even in such a case. When there is no disconnection etc. in the wires between the low voltage battery 2L and the inverter control device 20, electric power is supplied from the control device drive power supply 6 to the inverter control device 20, as described above. When power supply from the low voltage battery 2L to the inverter control device 20 is cut off, a power supply path is switched by a power supply changeover switch 7 so that electric power is supplied from the backup power supply 2B to the inverter control device 20. Specifically, when electric power (voltage) that is supplied from the low voltage battery 2L to the inverter control device 20 becomes equal to or lower than a predetermined reference value (first reference value), the power supply path is switched so that electric power is supplied from the backup power supply 2B to the inverter control device 20. As used herein, the low voltage power supply reduction state (second power supply reduction state) refers to the state where electric power that is supplied from the low voltage battery 2L to the inverter control device 20 has become equal to or lower than the predetermined reference value. A changeover control circuit 71 determines if the current state is the low voltage power supply reduction state or not. Accordingly, it can be said that the changeover control circuit 71 also functions as the power supply changeover switch 7.

The reference value (corresponding to the first reference value described below) that is used to determine if the current state is the low voltage power supply reduction state or not may be the lower limit (min. value) of the rated voltage under recommended operating conditions for the inverter control device 20. In this case, it is preferable that the changeover control circuit 71 determine if the current state is the low voltage power supply reduction state or not based on the output voltage of the control device drive power supply 6. In another form, it is also preferable that the changeover control circuit 71 determine if the current state is the low voltage power supply reduction state or not based on the voltage across the terminals of the low voltage battery 2L or the voltage across the input-side terminals of the control device drive power supply 6, as shown by dashed line in FIG. 1. That is, if it is determined before the control device drive power supply 6 can no longer output electric power required for the inverter control device 20 to operate that the current state is the low voltage power supply reduction state, and the power supply path is switched, the inverter control device 20 can continuously operate without stopping. In this case, the reference value can be set to, e.g., about 3 to 8 [V] according to the electrical characteristics of the regulator circuit forming the control device drive power supply 6.

When electric power that is supplied from the low voltage battery 2L (second DC power supply) to the inverter control device 20 becomes equal to or lower than the predetermined reference value (when the current state is the low voltage power supply reduction state (second power supply reduction state)), electric power is supplied from the backup power supply 2B, which uses the high voltage battery 2H (second DC power supply) as its power source, to the inverter control device 20 to cause the inverter control device 20 to perform fail-safe control (to cause the inverter 10 to perform a fail-safe operation). At this time, if the contactors 9 are open, the backup power supply 2B and the high voltage battery 2H are also disconnected from each other. However, the backup power supply 2B can use charge stored in the DC link capacitor 4 as its power source. Accordingly, it can be said that the backup power supply 2B uses the high voltage battery 2H and the DC link capacitor 4 as its power source. A specific example of the configuration of the backup power supply 2B will be described later with reference to FIG. 11.

If the Dc link capacitor 4 has not been sufficiently charged, the backup power supply 2B may not be able to provide enough electric power to cause the inverter control device 20 to perform fail-safe control. Accordingly, in the present embodiment, the changeover control circuit 71 switches the source of electric power for the inverter control device 20 after determining if the electric power (voltage)

that is output from the backup power supply 2B is enough for operation of the inverter control device 20 or not. That is, in the present embodiment, as described later with reference to FIG. 6, the changeover control circuit 71 switches the source of electric power for the inverter control device 20 when the electric power (voltage) that is supplied from the low voltage battery 2L to the inverter control device 20 becomes equal to or lower than the predetermined first reference value and the electric power that is output from the backup power supply 2B is equal to or higher than a predetermined second reference value.

In the case where the changeover control circuit 71 makes the determination based on comparison between the output of the control device drive power supply 6 and the first reference value and comparison between the output of the backup power supply 2B and the second reference value as shown by solid line in FIG. 1, it is preferable that "the first reference value < the second reference value." For example, the first reference value may be the lower limit (min. value) of the rated voltage under the recommended operating conditions for the inverter control device 20, and the second reference value may be a standard value (typ. value) of this rated voltage. It should be understood that the first reference value and the second reference value may be "the first reference value=the second reference value" such as both the first reference value and the second reference value being the standard value (typ. value) of this rated voltage. That is, it is preferable that the first reference value and the second reference value be "the first reference value ≤ the second reference value."

The second reference value may not be a fixed value but a variable value. For example, it is preferable that the second reference value be the output voltage of the control device drive power supply 6. Changeover is required when the output voltage of the control device drive power supply 6 decreases to the low voltage power supply reduction state (second power supply reduction state). In this case, a voltage higher than the output voltage of the control device drive power supply 6 in the low voltage power supply reduction state is required in order to supply electric power to the inverter control device 20 in place of the control device drive power supply 6. When the second reference value is the output voltage of the control device drive power supply 6, the power source can be switched to supply a voltage higher than the output voltage of the control device drive power supply 6.

Figure 6:
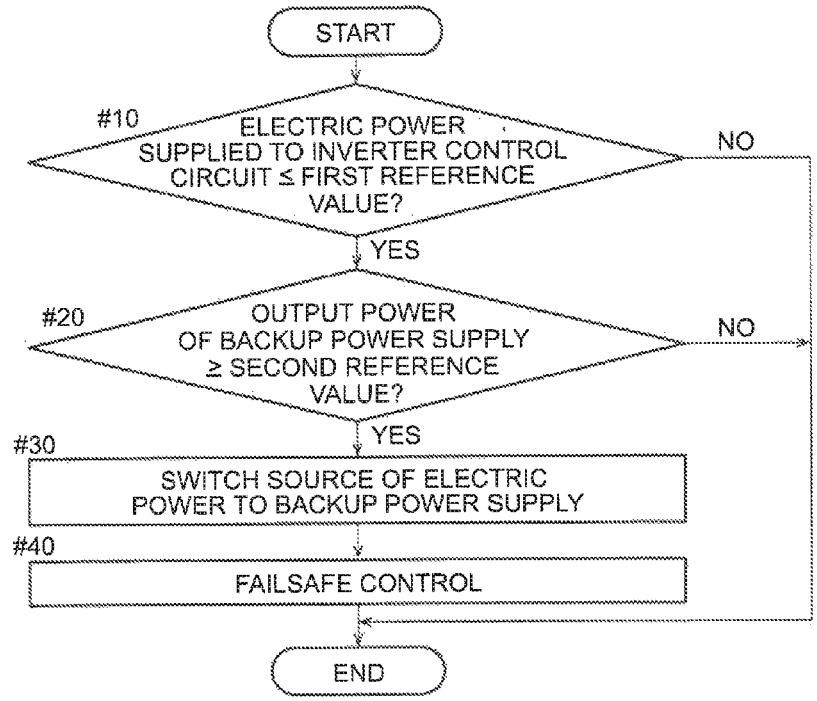
FIG. 6 is a flowchart illustrating an example of determination of switching by a changeover control circuit.

As described above, the changeover control circuit 71 may make the determination based on the voltage across the terminals of the low voltage battery 2L or the voltage across the input-side terminals of the control device drive power supply 6, as shown by dashed line in FIG. 6. The voltage across the terminals of the low voltage battery 2L and the voltage across the input-side terminals of the control device drive power supply 6 are voltages higher than the output voltage of the control device drive power supply 6. Accordingly, in this case, "the first reference value < the second reference value." For example, the first reference value may be the lower limit (min. value) of the rated voltage under recommended operating conditions for the control device drive power supply 6. The second reference value may be the standard value (typ. value) or the lower limit (min. value) of the rated voltage under the recommended operating conditions for the inverter control device 20.

As shown in FIG. 6, the changeover control circuit 71 first determines if the electric power (voltage) that is supplied from the low voltage battery 2L to the inverter control device 20 is equal to or lower than the predetermined first reference value or not (#10). If the electric power (voltage) that is supplied from the low voltage battery 2L to the inverter control device 20 is equal to or lower than the first reference value, the changeover control circuit 71 determines if the electric power that is output from the backup power supply 2B is equal to or higher than the predetermined second reference value or not (#20). If the electric power that is output from the backup power supply 2B is equal to or higher than the second reference value, the changeover control circuit 71 switches the source of electric power for the inverter control device 20 from the low voltage battery 2L (control device drive power supply 6) to the backup power supply 2B (#30). The inverter control device 20 is stably supplied with electric power to perform fail-safe control (#40). The present disclosure is not intended to preclude the configuration in which step #30 is omitted and the source of electric power for the inverter control device 20 is switched according only to the determination based on the first reference value.

As described above with reference to FIGS. 4 and 5, when the fail-safe control is performed, the switching rotational speed $\omega_{sw}$ is set and the type of control is switched based on the switching rotational speed $\omega_{sw}$. In the present embodiment, the inverter control device 20 switches the fail-safe control based on the switching rotational speed $\omega_{sw}$ that varies between when the contactors 9 are in an open state and when the contactors 9 are in a closed state. As described above with reference to FIG. 3, it is necessary to consider the following two points in the shutdown control. The first point is the magnitude of the battery current Ib when the contactors 9 are in a closed state, the second point is an increase in DC link voltage Vdc when the contactors 9 are in an open state. It is therefore preferable to set the SD maximum rotational speed $\omega_{sd}$ serving as the switching rotational speed $\omega_{sw}$ based on these two points.

In view of the first point, it is preferable that, when the contactors 9 are in a closed state, the SD maximum rotational speed $\omega_{sd}$ serving as the switching rotational speed $\omega_{sw}$ be set to a rotational speed at which regenerative power according to the rotational speed of the rotating electrical machine 80 and the battery current Ib (charging current) flowing through the high voltage battery 2H that is a chargeable power supply device are smaller than their maximum allowable rated values according to the voltage of the high voltage battery 2H. In the present embodiment, when the contactors 9 are in a closed state, the voltage of the high voltage battery 2H and the DC link voltage Vdc are substantially approximately equivalent. For example, when the voltage (battery voltage) across the terminals of the high voltage battery 2H is the lower limit of the rated range, the maximum rated value of the battery current Ib (charging current) can be the value of the current flowing through the high voltage battery 2ll.

Figure 7:
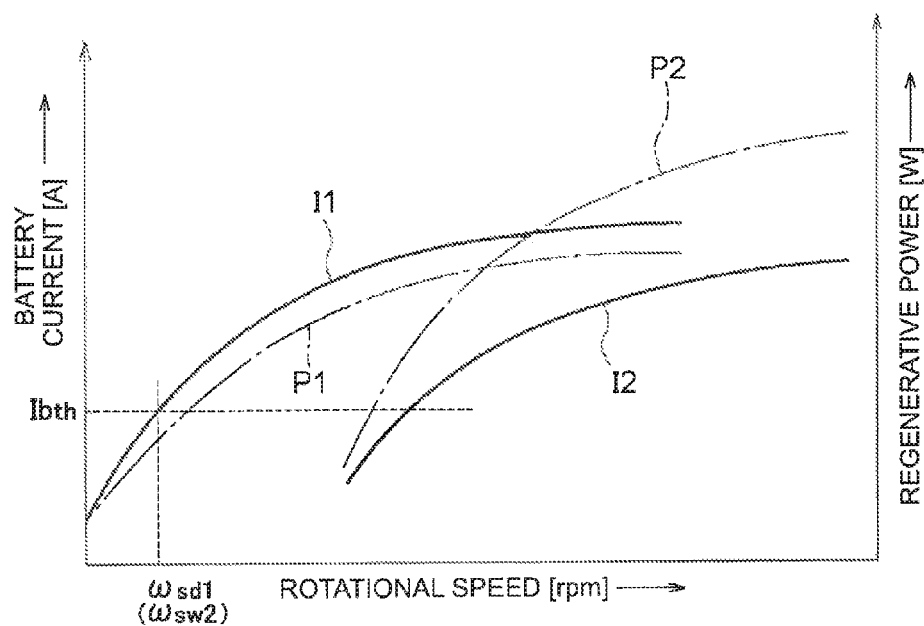
FIG. 7 is a diagram showing the relationship between the rotational speed and the regenerative power and battery current.

FIG. 7 shows the relationship between the rotational speed ω and the battery current Ib (I1, I2) and the relationship between the rotational speed ω and the regenerative power (P1, P2). In the figure, solid lines I1, I2 show the battery current Ib, and alternate long and short dash lines P1, P2 show the regenerative power, I2 and P2 show the battery current (I2) and the regenerative power (P2) in the case where the battery voltage is the upper limit of the rated range of the high voltage battery 2H. I1 and P1 show the battery current (I1) and the regenerative power (P1) in the case where the battery voltage is the lower limit of the rated range of the high voltage battery 2H. This figure shows that the lower the battery voltage is, the more easily the battery current Ib flows, and a higher battery current Ib flows in a lower rotational speed region. Accordingly, it is preferable that, when the battery voltage is the lower limit of the rated range of the high voltage battery 2H, the SD maximum rotational speed $\omega_{sd}$ be set to the rotational speed ($\omega_{sd1}$) at which the battery current Ib is smaller than the maximum allowable rated value (Ibth).

This example shows the case where the SD maximum rotational speed $\omega_{sd}$ ($\omega_{sd1}$) is set based on the maximum allowable rated value (Ibth) of the battery current Ib. However, the SD maximum rotational speed $\omega_{sd}$ may be set based on the maximum allowable rated value (not shown) of the regenerative power.

It should be understood that it is preferable to set the SD maximum rotational speed $\omega_{sd}$ to the lower one of the rotational speeds that are based on both of the above two reference values.

Figure 8:
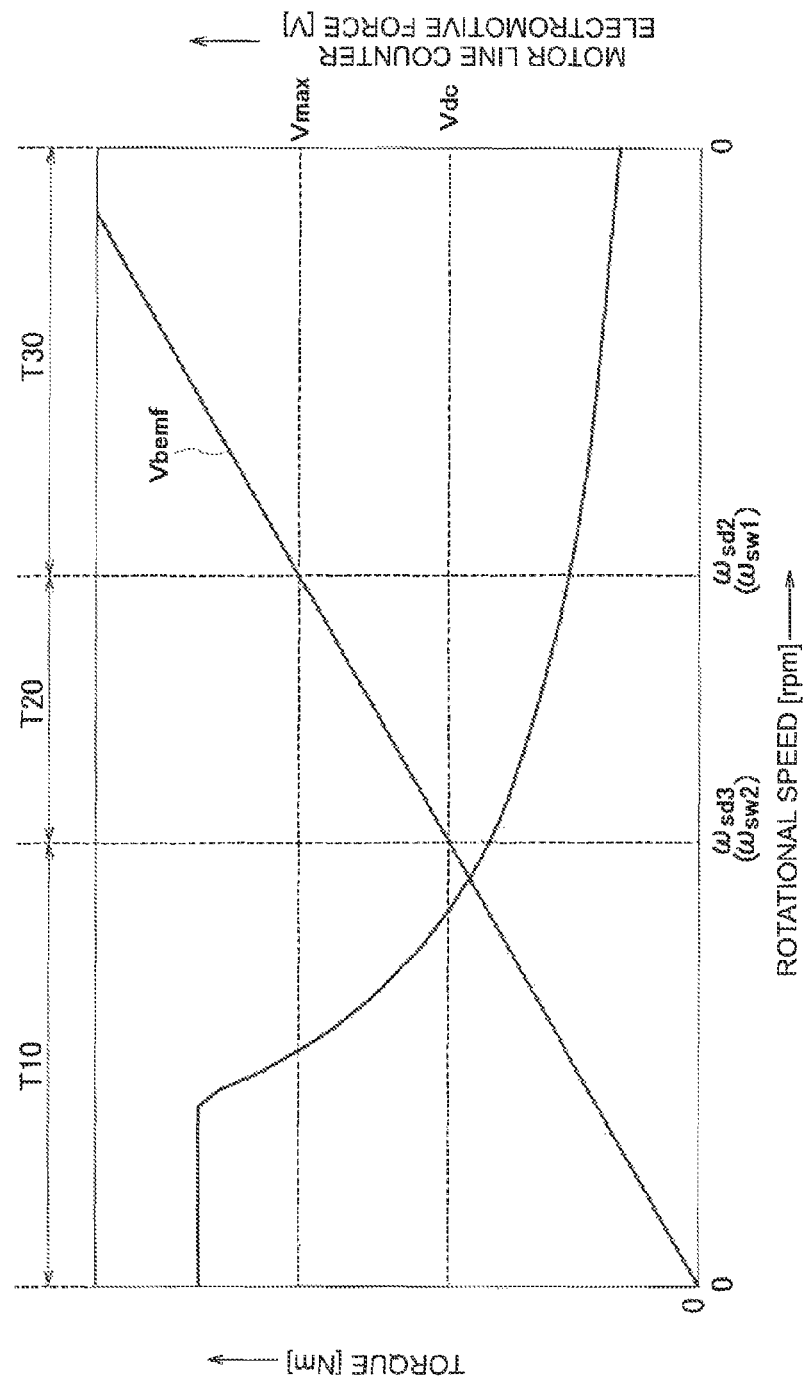
FIG. 8 is a diagram showing the relationship between the motor line counter electromotive voltage and the rotational speed.

In view of the second point (increase in DC link voltage Vdc when the contactors 9 are in an open state), it is preferable that, when the contactors 9 are in an open state, the SD maximum rotational speed $\omega_{sd}$ serving as switching rotational speed $\omega_{sw}$ be set to the rotational speed at which a peak value of the line counter electromotive force of the plurality of phases (in this example, three phases) is smaller than the maximum allowable rated voltage of the rotating electrical machine drive device. FIG. 8 is a partial enlarged view of the torque map of FIG. 4, showing the relationship between the rotational speed ω and the motor line counter electromotive voltage Vbemf. FIG. 8 simply shows the relationship between the rotational speed ω and the motor line counter electromotive voltage Vbemf, and this relationship is irrelevant to whether the contactors 9 are open or closed. For example, whether the contactors 9 are open or closed may be determined based on communication from the vehicle control unit or may be determined based on the detection result of a voltage sensor 14 that detects the DC link voltage Vdc. Whether the contactors 9 are open or closed may be determined based on an abrupt change in current (battery current Ib) of the high voltage battery 2H detected by a battery current sensor 15.

In the figure, the voltage "Vmax" is the value of the smallest one of the maximum allowable rated voltages of the rotating electrical machine drive device, that is, the maximum rated voltages of the DC link capacitor 4 and the inverter 10 (switching elements 3). When the contactors 9 are in an open state, the motor line counter electromotive voltage Vbemf is applied substantially as it is to the DC side of the inverter 10. Accordingly, it is preferable that, when the contactors 9 are in an open state, the shutdown control be prohibited in a region (T30) where the rotational speed is higher than the rotational speed ($\omega_{sd2}$) at which the motor line counter electromotive voltage Vbemf that increases in proportion to the rotational speed reaches the maximum rated voltage Vmax. Accordingly, when the contactors 9 are in a closed state, the SD maximum rotational speed $\omega_{sd}$ can be set to the rotational speed ($\omega_{d2}$) at which the motor line counter electromotive voltage Vbemf reaches the maximum rated voltage Vmax.

When the contactors 9 are in a closed state, the voltage of the high voltage battery 2H is applied to the DC side of the inverter 10, and this voltage serves as the DC link voltage Vdc. For example, if the motor line counter electromotive voltage Vbemf becomes higher than the DC link voltage Vdc during the shutdown control, the diodes 5 that are connected antiparallel to the switching elements 3 become conductive. That is, a current that charges the high voltage battery 2H is supplied. Accordingly, for setting of the SD maximum rotational speed $\omega_{sd}$, the battery current Ib, regenerative power, regenerative torque, etc. need to be considered, as described above regarding the first point to be considered. The region (T20) from the rotational speed ($\omega_{sd3}$) at which the motor line counter electromotive voltage Vbemf reaches the DC link voltage Vdc to the rotational speed ($\omega_{sd2}$) at which the motor line counter electromotive voltage Vbemf reaches the maximum rated voltage Vmax is therefore is the region where the shutdown control can be performed conditionally. The region (T10) where the rotational speed is lower than the rotational speed ($\omega_{sd3}$) at which the motor line counter electromotive voltage Vbemf reaches the DC link voltage Vdc is the region where the shutdown control can be performed without any specific conditions.

Figure 9:
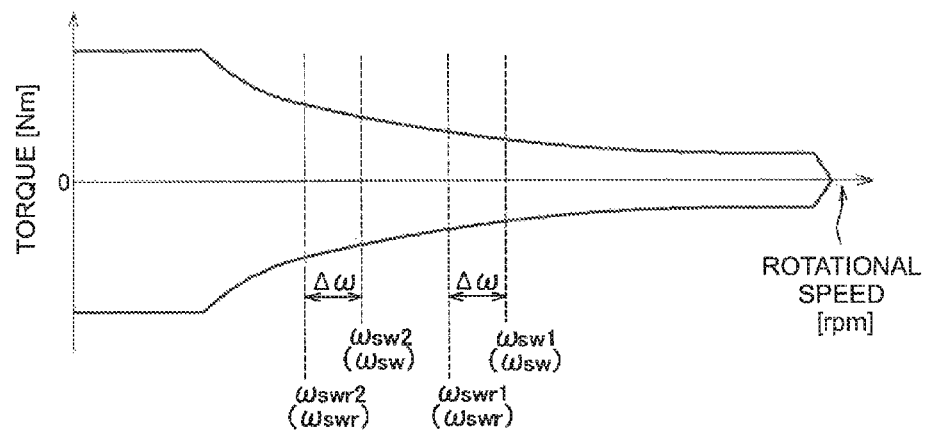
FIG. 9 is a diagram showing the relationship between the switching rotational speed and the fail-safe control according to whether the contactors are open or closed.

In a preferred embodiment, the inverter control device 20 switches the fail-safe control based on the switching rotational speed $\omega_{sw}$ that varies between when the contactors 9 are in an open state and when the contactors 9 are in a closed state. In the present embodiment, the switching rotational speed $\omega_{sw}$ is higher when the contactors 9 are in an open state than when the contactors 9 are in a closed state. As shown in FIG. 9, a first switching rotational speed $\omega_{sw1}$ is the switching rotational speed $\omega_{sw}$ when the contactors 9 are in an open state, and a second switching rotational speed $\omega_{sw2}$ is the switching rotational speed $\omega_{sw}$ when the contactors 9 are in a closed state. A first shift switching rotational speed $\omega_{swr1}$ is the shift switching rotational speed $\omega_{swr}$ when the contactors 9 are in an open state, and a second shift switching rotational speed $\omega_{sw2}$ is the shift switching rotational speed $\omega_{swr}$ when the contactors 9 are in a closed state.

Figure 10:
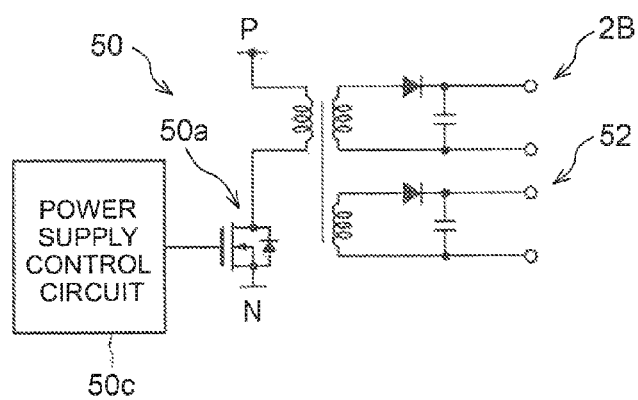
FIG. 10 is a diagram schematically showing an example of the configuration of a backup power supply and a lower stage gate drive power supply.

As described above, in the present embodiment, the backup power supply 2B and the lower stage gate drive power supply 52 are produced by using the high voltage battery 2H as a power source. FIG. 10 illustrates a power supply circuit 50 that is formed by a transformer and that uses the high voltage battery 2H as its power source. The power supply circuit 50 has a switching element 50a that controls a voltage to be applied to a primary coil and a power supply control circuit 50c that controls the switching element 50a. In this example, the power supply circuit 50 has a flyback configuration. When a primary voltage for the transformer has been stabilized, the output voltage on the secondary side is determined by the transformation ratio of the transformer without being fed back to the primary side. That is, the backup power supply 2B having an output voltage of, e.g., about 3.3 to 5 [V] and the lower stage gate drive power supply 52 having an output voltage of, e.g., about 15 to 20 [V] are formed according to the transformation ratio of the transformer.

All the emitter sides of the lower stage switching elements 32 of the inverter 10 shown in FIG. 1 are connected to the negative electrode. Accordingly, the lower stage switching elements 32 have a common negative side (ground side), and the lower stage gate drive power supply 52 can be a power supply that also has a common negative side (ground side). In the present embodiment, as shown in FIGS. 1 and 10, the lower stage gate drive power supply 52 is formed as a power supply that supplies electric power to the lower stage gate drive circuits 30 of all the three phases by a set of transformers. Large loss is caused when the drive circuit power supply (51, 52) having a power supply voltage of about 20 [V] is produced from the high voltage battery 2H having a very high power supply voltage of 200 to 400 [V]. However, since the lower stage gate drive power supply 52 need not be separately provided for each of the phases (each of the arms) and can be common to all the phases (the arms), such loss can be restrained.

Figure 11:
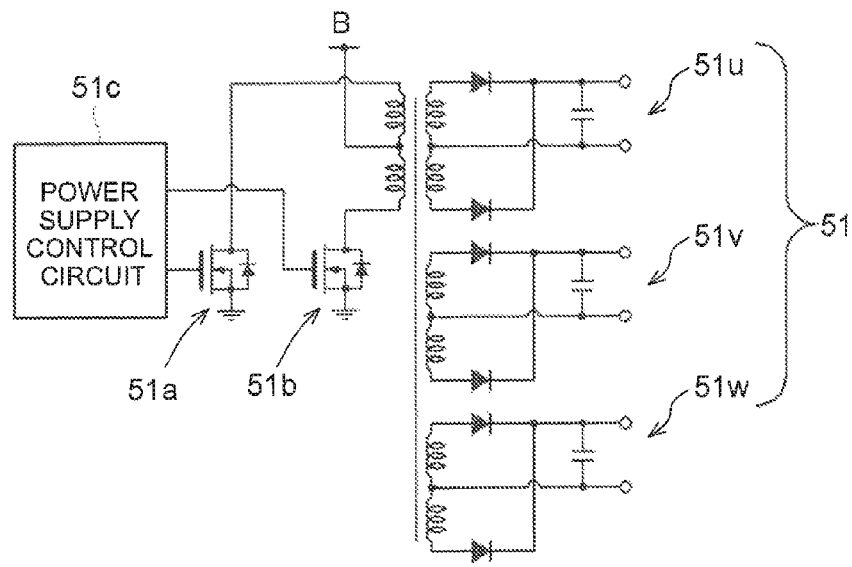
FIG. 11 is a diagram schematically showing an example of the configuration of an upper stage gate drive power supply.

FIG. 11 illustrates the circuit configuration of the upper stage gate drive power supply 51. For example, the upper stage gate drive power supply 51 can be a power supply circuit that is formed by a transformer and that uses the low voltage battery 2L as its power source. Regarding the upper stage gate drive power supply 51, as shown in FIG. 1, the emitter sides of the upper stage switching elements 31 of the inverter 10 shown in FIG. 1 are connected to the stator coils 8 of the rotating electrical machine 80 and have different potentials. Accordingly, unlike the lower stage gate drive power supply 52, the upper stage gate drive power supply 51 cannot be common to all the phases (the arms) and needs to be separately provided for each of the phases (each of the arms). That is, as shown in FIG. 11, separate upper stage gate drive power supplies, namely a U-phase upper stage gate drive power supply 51u, a V-phase upper stage gate drive power supply 51v, and a W-phase upper stage gate drive power supply 51w, are formed on the secondary side of the transformer.

The upper stage gate drive power supply 51 has two switching elements 51a, 51b that control a voltage to be applied to a primary coil, and a power supply control circuit 51c that controls the switching element 51a, 51b. In this example, the upper stage gate drive power supply 51 has a push-pull configuration. When a primary voltage for the transformer has been stabilized, the output voltage on the secondary side is determined by the transformation ratio of the transformer without being fed back to the primary side. That is, the upper stage gate drive power supply 51 having an output voltage of, e.g., about 15 to 20 [V] is formed according to the transformation ratio of the transformer. In the present embodiment, since the upper stage gate drive power supply 51 is formed which uses the low voltage battery 2L having a power supply voltage of 12 to 14 [V] as its power source and that has a power supply voltage of about 20 [V], loss can be restrained.

Other Embodiments

Other embodiments of the rotating electrical machine control device will be described below. The configuration of each embodiment described below may not only be used by itself, but also be combined with any of the configurations of the other embodiments unless inconsistency arises.

(1) The above description shows an example in which the active short-circuit control and the shutdown control are selectively performed as the fail-safe control. However, the present disclosure is not intended to preclude the configuration in which the inverter control device 20 performs only the active short-circuit control as the fail-safe control. That is, the inverter control device 20 may cause the switching elements 3 of the inverter 10 to perform a switching operation, and if an overcurrent, an overvoltage, etc. occurs in the rotating electrical machine drive device, the inverter control device 2 may perform the fail-safe control including at least the active short-circuit control to cause the inverter 10 to perform a switching operation. Similarly, the present disclosure is not intended to preclude the configuration in which the inverter control device 20 performs only the shutdown control as the fail-safe control. That is, the inverter control device 20 may cause the switching elements 3 of the inverter 10 to perform a switching operation and may perform the fail-safe control including at least the shutdown control to cause the inverter 10 to perform a switching operation.

Figure 12:
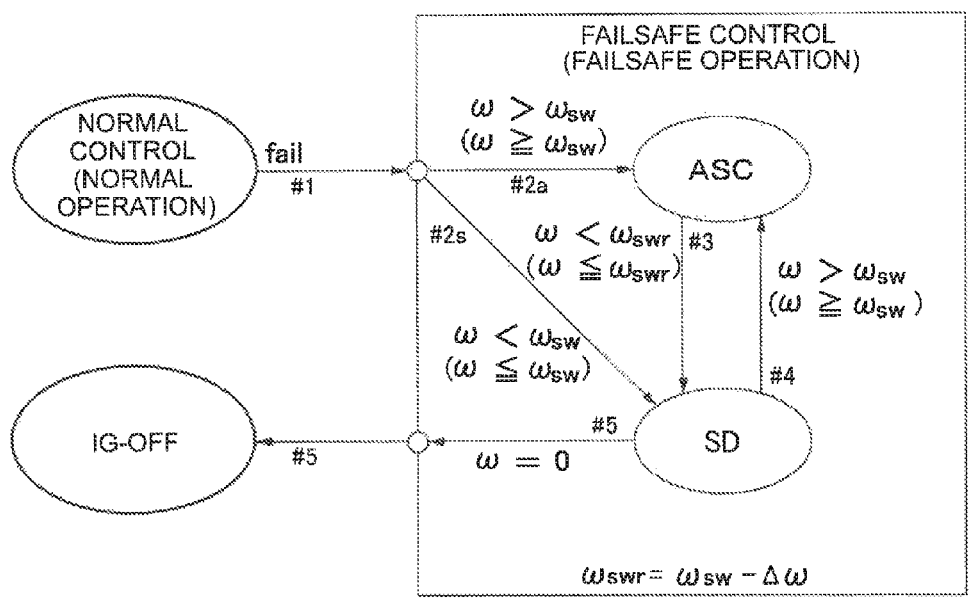
FIG. 12 is a state transition diagram of the fail-safe control under different switching conditions.

(2) The state transition that is made when the fail-safe control is switched between the shutdown control and the active short-circuit control is not limited to the embodiment illustrated with reference to FIG. 5. For example, the state transition may be made under the conditions illustrated in FIG. 12. Since step #1, step #2a, step #2s, and step #5 are as described above with reference to the state transition diagram of FIG. 5, description thereof will be omitted. For starting of the fail-safe control, the rotational speed region that is higher than the switching rotational speed $\omega_{sw}$ is the high rotational speed region, and the rotational speed region that is lower than the switching rotational speed $\omega_{sw}$ is the low rotational speed region (step #2a, step #2s).

If, during the active short-circuit control (ASC), the rotational speed to becomes lower than the shift switching rotational speed $\omega_{swr}(=\omega_{sw}-\Delta\omega)$ that is lower than the switching rotational speed $\omega_{sw}$ by $\Delta\omega$, the fail-safe control is switched to the shutdown control (SD) (#3). In this case, the rotational speed region that is higher than the shift switching rotational speed $\omega_{swr}$ is the high rotational speed region, and the rotational speed region that is lower than the shift switching rotational speed $\omega_{swr}$ is the low rotational speed region. If the rotational speed $\omega$ becomes higher than the switching rotational speed $\omega_{sw}$ (SD maximum rotational speed $\omega_{sd}$) during the shutdown control (SD), the fail-safe control is switched to the active short-circuit control (ASC) (#4). In this case, the period between the switching rotational speed $\omega_{sw}$ and the shift switching rotational speed $\omega_{swr}$ is what is called a hysteresis section.

(3) The above description illustrates an example in which the first switching rotational speed $\omega_{sw1}$ and the second switching rotational speed $\omega_{sw2}$ are selectively used according to whether the contactors 9 are open or closed. However, only one of the first switching rotational speed $\omega_{sw1}$ and the second switching rotational speed $\omega_{sw2}$, preferably a lower one of the first switching rotational speed $\omega_{sw1}$ and the second switching rotational speed $\omega_{sw2}$ (in the present embodiment, the second switching rotational speed $\omega_{sw2}$, may be the switching rotational speed $\omega_{sw}$. The above description also illustrates an example in which the shift switching rotational speed $\omega_{swr}$ is also provided as the switching rotational speed $\omega_{sw}$, and the shift switching rotational speed $\omega_{swr}$ is also selectively used according to the type of fail-safe operation while in operation. However, the first switching rotational speed $\omega_{sw1}$, the second switching rotational speed $\omega_{sw2}$, and the shift switching rotational speed $\omega_{swr}$ may not be selectively used, and the fail-safe control may be switched base only on the switching rotational speed $\omega_{sw}$.

(4) The above description illustrates an example in which the first DC power supply (the high voltage battery 2H) and the second DC power supply (the low voltage battery 2L) are power supply devices that are insulated from each other and independent of each other. However, for example, the second DC power supply (the low voltage battery 2L) may be formed as a power supply device stepped down from the first DC power supply (the high voltage battery 2H) through a converter etc. That is, the present disclosure is not intended to preclude the configuration in which, for example, only the first DC power supply is a chargeable power supply device such as a secondary battery or an electric double-layer capacitor and the second DC power supply is formed by a power supply device for which power storage is not considered such as a transformer or a regulation circuit. The above description illustrates an example in which the first DC power supply and the second DC power supply are power supply devices having significantly different power supply voltages. However, the present disclosure is not intended to preclude the configuration in which the first DC power supply and the second DC power supply are formed as power supply devices having the same rated power supply voltage. It should be understood that the power supply voltage of the second DC power supply may be higher than that of the first DC power supply.

Outline of Embodiments

A brief outline of the rotating electrical machine control device (1) described above will be provided below.

According to one aspect, a characteristic configuration of a rotating electrical machine control device (1) that drivingly controls an AC rotating electrical machine (80) drivingly coupled to wheels (W) of a vehicle includes: an inverter control device (20), which controls a rotating electrical machine drive device including an inverter (10) that is connected to a first DC power supply (2H) and also connected to the rotating electrical machine (80) to convert electric power between a direct current of the first DC power supply (2H) and an alternating current of a plurality of phases of the rotating electrical machine (80), and which operates with electric power supplied from a second DC power supply (2L) different from the first DC power supply (2H); and a DC link capacitor (4) that smoothes a DC link voltage (Vdc), the DC link voltage (Vdc) being a voltage on a DC side of the inverter (10), wherein the inverter (10) and the DC link capacitor (4) are connected to the first DC power supply (2H) through a contactor (9) that cuts off supply of electric power when in an open state, in the inverter (10), an arm corresponding to a single phase of the alternating current is formed by a series circuit of an upper stage switching element (31) and a lower stage switching element (32), and the inverter (10) includes freewheeling diodes (5) that are connected in parallel with the respective switching elements (3) so that a direction from a lower stage toward an upper stage is a forward direction, and the inverter control device (20) causes the switching elements (3) of the inverter (10) to perform a switching operation. The rotating electrical machine control device (1) further includes: a backup power supply (2B) that uses the first DC power supply (2H) as its power source; and a changeover control circuit (71) that switches a source of electric power for the inverter control device (20) to the backup power supply (2B), wherein the changeover control circuit (71) switches the source of electric power for the inverter control device (20) when the electric power that is supplied from the second DC power supply (2L) to the inverter control device (20) becomes equal to or lower than a predetermined first reference value and electric power that is output from the backup power supply (2B) is equal to or higher than a predetermined second reference value, and the inverter control device (20) uses the electric power supplied from the backup power supply (2B) to cause the inverter (10) to perform the switching operation to perform fail-safe control.

The backup power supply (2B) uses as its power source the first DC power supply (2H) that is a different power supply from the second DC power supply (2L). Accordingly, even if disconnection etc. occurs in any wire in the second DC power supply (2L) or in any wire around the second DC power supply (2L), electric power can be supplied to the inverter control device (20) regardless of such a condition. Therefore, even if power supply from the second DC power supply (2L) to the inverter control device (20) is cut off, the inverter control device (20) can perform the fail-safe control to cause the inverter (10) to perform a fail-safe operation (switching operation). For example, in a configuration in which the inverter control device (20) cannot perform the fail-safe control when power supply from the second DC power supply (2L) is cut off, a fail-safe circuit may need to be separately provided in order to cause the inverter (10) to perform a fail-safe operation (switching operation) in place of the inverter control device (20). According to the above configuration, however, the inverter control device (20) can cause the inverter (10) to perform a fail-safe operation (switching operation) without providing such a fail-safe circuit. That is, according to above configuration, even if power supply from the power supply to the inverter control device (20) is cut off, the fail-safe control can be performed on the rotating electrical machine drive device including the inverter (10) to cause the inverter (10) to appropriately perform a switching operation.

It is preferable that the fail-safe control be at least active short-circuit control in which the upper stage switching elements (31) of the arms of all of the plurality of phases are turned on or the lower stage switching elements (32) of the arms of all of the plurality of phases are turned on. In the active short-circuit control, electric power generated by the rotating electrical machine (80) rotating due to inertia is not regenerated to the first DC power supply (2H) but is circulated between the inverter (10) and the rotating electrical machine (80). This restrains a current flowing through the first DC power supply (2H) from becoming excessively large and restrains a voltage (DC link voltage (Vdc)) across terminals of the DC link capacitor (4) from becoming excessively large, whereby appropriate fail-safe control can be implemented.

It is preferable that the fail-safe control further include shut-down control in which all of the switching elements (3) are turned off, and at least according to a rotational speed ($\omega$) of the rotating electrical machine (80), the active short-circuit control be performed in a high rotational speed region, and the shutdown control be performed in a low rotational speed region that is lower than the high rotational speed region.

A counter electromotive force of the rotating electrical machine (80) increases according to the rotational speed ($\omega$) of the rotating electrical machine (80). Accordingly, when the shutdown control is performed, a current (Ib) flowing through the second DC power supply (2H) in order to charge the second DC power supply (2H) and the DC link voltage (Vdc) that is a voltage on the DC side of the inverter (10) tend to increase according to the rotational speed ($\omega$). In the active short-circuit control, since a current based on energy of stator coils (8) of the rotating electrical machine (80) circulates between the stator coils (8) and the inverter (10), neither the charging current (Ib) flows through the second DC power supply (2H) nor the DC link voltage (Vdc) increases. If the active short-circuit control is performed at a low rotational speed ($\omega$), large negative torque may be generated in the rotating electrical machine (80). If the active short-circuit control continues for a long time, the amount of heat generation of the rotating electrical machine (80) increases.

According to the above configuration, since the active short-circuit control is performed in the high rotational speed region where the rotational speed ($\omega$) of the rotating electrical machine (80) is relatively high, an increase in current (Ib) flowing through the first DC power supply (2H) and an increase in DC link voltage (Vdc) are restrained. Since the shutdown control is performed in the low rotational speed region where the rotational speed ($\omega$) of the rotating electrical machine (80) is relatively low, generation of large negative torque in the rotating electrical machine (80) can be restrained and the duration of the active short-circuit control can be reduced. In the low rotational speed region, an increase in DC link current (Vdc) and an increase in current (Ib) flowing through the first DC power supply (2H) due to the shutdown control are restrained as compared to those in the high rotational speed region. That is, according to the above configuration, if an overcurrent, an overvoltage, etc. occurs in the rotating electrical machine drive device, the fail-safe control can be appropriately performed while restraining an increase in current (Ib) flowing through the first DC power supply (2H) and an increase in DC link voltage (Vdc). Since the backup power supply (2B) is provided, appropriate fail-safe control can thus be performed even if supply of electric power from the first DC power supply (2H) to the inverter control device (20) is cut off and an overcurrent, as overvoltage, etc. occurs in the rotating electrical machine drive device including the inverter (10).

In one aspect, it is preferable that, in the rotating electrical machine control device (1), in the case where the backup power supply (2B) uses the first DC power supply (2H) and the DC link capacitor (4) as its power source, the inverter control device (20) perform the fail-safe control based on the switching rotational speed ($\omega_{sw}$) that varies between when the contactor (9) is in an open state and when the contactor (9) is in a closed state.

Regenerative power flows to the first DC power supply (2H) when the contactor (9) is in the closed state.

It is therefore preferable that one criterion that is used to permit the shutdown control be determined in view of the current flowing through the first DC power supply (2H). When the contact (9) is in the open state, connection to the first DC power supply (2H) is shut off. Accordingly, the regenerative power does not flow to the first DC power supply (2H) but charges the DC link capacitor (4), increasing the DC link voltage (Vdc). It is therefore preferable that one criterion that is used to permit the shutdown control be determined in view of the counter electromotive force (line counter electromotive force of the alternating current of the plurality of phases) that increases the DC link voltage (Vdc). In many cases, the rotational speed ($\omega$) of the rotating electrical machine (80) in view of the current flowing through the first DC power supply (2H) and the rotational speed ($\omega$) of the rotating electrical machine (80) in view of the line counter electromotive force (Vbemf) are different rotational speeds ($\omega$). In order to perform appropriate fail-safe control, it is therefore preferable that the switching rotational speed ($\omega_{sw}$) vary between when the contactor (9) is in the open state and when the contactor (9) is in the closed state.

Even if the contactor (9) is opened, charge stored in the DC link capacitor (4) can be used as the power source of the backup power supply (2B). Since the DC link capacitor (4) is charged while the rotating electrical machine (80) is rotating, the fail-safe control can be continued by the electric power supplied from the backup power supply (2B), until the rotating electrical machine (80) stops rotating and the DC link capacitor (4) discharges.

When the contactor (9) is in the closed state, a voltage across terminals of the first DC power supply (2H) is approximately the same as the DC link voltage (Vdc). Accordingly, if the line counter electromotive force (Vbemf) becomes larger than the DC link voltage (Vdc), a current flows toward the first DC power supply (2H). In many cases, a withstanding voltage of a circuit element on the DC side of the inverter (10) is higher than a maximum rated value of the voltage across the terminals of the first DC power supply (2H) so that the circuit element is resistant to a momentary increase in line counter electromotive force (Vbemf). Accordingly, in many cases, the line counter electromotive force (Vbemf) corresponding to the withstanding voltage of the circuit element on the DC side of the inverter (10) is higher than the line counter electromotive force (Vbemf) that causes a maximum allowable value of the current flowing through the first DC power supply (2H). The line counter electromotive force (Vbemf) increases according to the rotational speed ($\omega$) of the rotating electrical machine (80). Accordingly, an allowable rotational speed ($\omega$) of the rotating electrical machine (80) is higher when no current flows in the first DC power supply (2H) and the DC link voltage (Vdc) is increased, that is, when the contactor (9) is in the open state. In one aspect, it is therefore preferable that the switching rotational speed ($\omega_{sw}$) be higher when the contactor (9) is in the open state than when the contactor (9) is in the closed state.

It is preferable that the first DC power supply (2H) be a chargeable power supply device, and when the contactor (9) is in the closed state, the switching rotational speed ($\omega_{sw}$) be a rotational speed ($\omega_{sw2}$) at which regenerative power according to the rotational speed of the rotating electrical machine (80) and a charging current (Ib) flowing through the first DC power supply (2H) are smaller than their maximum allowable rated values according to a voltage of the first DC power supply (2H). It is also preferable that, when the contactor (9) is in the open state, the switching rotational speed ($\omega_{sw}$) be a rotational speed ($\omega_{sw1}$) at which a peak value of the line counter electromotive force (Vbemf) of the alternating current of the plurality of phases is smaller than a maximum allowable rated voltage of the rotating electrical machine drive device. It is preferable that, when the contactor (9) is in the closed state, the switching rotational speed ($\omega_{sw}$) be determined according to a maximum rated value of the charging current (Ib) as described above, because the current charging the first DC power supply (2H) flows through the contactor (9). It is preferable that, when the contactor (9) is in the open state, the switching rotational speed ($\omega_{sw}$) be determined according to the maximum allowable rated voltage of the rotating electrical machine drive device, because the line counter electromotive force (Vbemf) increases the DC link voltage (Vdc) of the inverter (10).

It is preferable that, if the rotational speed ($\omega$) of the rotating electrical machine (80) changes during the fail-safe control, the type of fail-safe control be switched according to the rotational speed ($\omega$). If no new driving force including external forces such as gravity is applied to the wheels (W), the rotational speed of the rotating electrical machine (80) decreases during the fail-safe control. Accordingly, even if the rotational speed ($\omega$) of the rotating electrical machine (80) is in the high rotational speed region at the time the fail-safe control is started, the rotational speed ($\omega$) of the rotating electrical machine (80) decreases to the low rotational speed region as the failsafe control continues. The active short-circuit control is performed in the high rotational speed region. At this time, a current is circulated between the stator coils (8) and the inverter (20). Most of the energy is consumed as heat by the stator coils (8) and the inverter (10). Although description of a detailed phenomenon will be omitted, overheating of the rotating electrical machine (80) and the inverter (20) is not preferable in terms of maintenance of performance and service life. It is therefore preferable that the active short-circuit control be terminated at an appropriate timing according to the decrease in rotational speed ($\omega$) of the rotating electrical machine (80). For example, when the vehicle is moving down the slope, the rotational speed (ω) of the rotating electrical machine (80) drivingly coupled to the wheels (W) may increase and transition from the low rotational speed region to the high rotational speed region. If the shutdown control is being performed at this time, the current (Ib) flowing through the first DC power supply (2H) and the DC link voltage (Vdc) may increase and become larger than an appropriate range. In such a case, it is preferable that the type of fail-safe control be switched from the shutdown control to the active short-circuit control.

That is, in one aspect, it is preferable that, when the rotational speed (ω) of the rotating electrical machine (80) increases to the high rotational speed region during the shutdown control, the inverter control device (0) switch the fail-safe control to the active short-circuit control, and when the rotational speed (ω) of the rotating electrical machine (80) decreases to the low rotational speed region during the active short-circuit control, the inverter control device (20) switch the fail-safe control to the shutdown control.

As described above, even when the electric power that is supplied from the second DC power supply (2L) to the inverter control device (20) becomes lower than the predetermined reference value (second power supply reduction state), the electric power is supplied from the backup power supply to the inverter control device (20). Accordingly, the inverter control device (20) can perform appropriate fail-safe control. In many cases, switching control signals are applied from the inverter control device (20) to the switching elements (3) of the inverter (10) through control signal drive circuits that enhance electrical driving capability. Accordingly, if supply of electric power to the control signal drive circuits for the switching elements (3) is disrupted, it may not be possible to cause the inverter (10) to perform a fail-safe operation by the fail-safe control even if the inverter control device (20) is working. In particular, in the active short-circuit control, since the upper stage switching elements (31) or the lower stage switching elements (32) are turned on, the electric power need also to be supplied to the control signal drive circuits.

All the upper stage switching elements (31) or all the lower stage switching elements (32) are turned on in the active circuit control. Accordingly, at least power supply to the control signal drive circuits for all the upper stage switching elements (31) or power supply to the control signal drive circuits for all the lower stage switching elements (32) need only to be ensured even in the second power supply reduction state. That is, in one aspect, it is preferable that, in the case where the rotating electrical machine control device includes a plurality of control signal drive circuits (30) that enhance switching control signals, which are generated by the inverter control device (20) to control the switching elements (3), and relay the resultant switching control signals, electric power from a power supply (52) that uses the first DC power supply (2H) as its power source be supplied to at least one of the control signal drive circuits (30) in the upper stage which relay the switching control signals to the upper stage switching elements (3) and the control signal drive circuits (30) in the lower stage which relay the switching control signals to the lower stage switching elements (32).

Typically, all the emitter sides (source sides) of the lower stage switching elements (32) of the inverter (10) are connected to a negative electrode. Accordingly, the lower stage switching elements (32) have a common negative side (ground side), and the control signal drive circuits (30) in the lower stage also have a common negative side (ground side). The power supply (52) that supplies electric power to the control signal drive circuits (30) in the lower stage therefore can be a common power supply. Typically, the emitter sides (source sides) of the upper stage switching elements (31) are connected to the stator coils (8) of the rotating electrical machine (80), and the upper stage switching elements (31) have different potentials at their negative electrode sides (ground sides). Accordingly, a power supply (51) that supplies electric power to the control signal drive circuits (30) in the upper stage cannot be a common power supply, and electric power is shared from individual power supplies (51u, 51v, 51w) to the control signal drive circuits (30) in the upper stage. It is therefore more preferable that the electric power from the power supply (52) that uses the first DC power supply (2H) as its power source be supplied to the control signal drive circuits (30) in the lower stage which relay the switching control signals to the lower stage switching elements (32).

The invention claimed is:

1. A rotating electrical machine control device that drivingly controls an AC rotating electrical machine drivingly coupled to wheels of a vehicle, the rotating electrical machine control device comprising:
   electronic control unit, which controls a rotating electrical machine drive device that includes an inverter that is connected to a first DC power supply and also connected to the rotating electrical machine to convert electric power between a direct current of the first DC power supply and an alternating current of a plurality of phases of the rotating electrical machine, and which operates with electric power supplied from a second DC power supply different from the first DC power supply;
   a DC link capacitor that smooths a DC link voltage, the DC link voltage being a voltage on a DC side of the inverter, wherein
      the inverter and the DC link capacitor are connected to the first DC power supply through a contactor that cuts off supply of electric power when in an open state,
      in the inverter, an arm corresponding to a single phase of the alternating current is formed by a series circuit of an upper stage switching element and a lower stage switching element, and the inverter includes freewheeling diodes that are connected in parallel with the respective switching elements so that a direction from a lower stage toward an upper stage is a forward direction, and
      the electronic control unit causes the switching elements of the inverter to perform a switching operation:
   a backup power supply that uses the first DC power supply as a power source for the backup power supply; and
   a changeover control circuit that switches a source of electric power for the electronic control unit to the backup power supply, wherein
      the changeover control circuit switches the source of electric power for the electronic control unit when the electric power that is supplied from the second DC power supply to the electronic control unit becomes equal to or lower than a predetermined first reference value and electric power that is output from the backup power supply is equal to or higher than a predetermined second reference value, and the electronic control unit uses the electric power supplied from the backup power supply to cause the inverter to perform the switching operation to perform fail-safe control.

2. The rotating electrical machine control device according to claim 1, wherein
the fail-safe control is at least active short-circuit control in which the upper stage switching elements of the arms of all of the plurality of phases are turned on or the lower stage switching elements of the arms of all of the plurality of phases are turned on.

3. The rotating electrical machine control device according to claim 2, wherein
the fail-safe control further includes shutdown control in which all of the switching elements are turned off, and
at least according to a rotational speed of the rotating electrical machine, the active short-circuit control is performed in a high rotational speed region where the rotational speed of the rotating electrical machine is equal to or higher than a predetermined switching rotational speed, and the shutdown control is performed in a low rotational speed region that is lower than the high rotational speed region.

4. The rotating electrical machine control device according to claim 3, wherein
the backup power supply uses the first DC power supply and the DC link capacitor as the power source of the backup power supply, and
the fail-safe control is performed based on the switching rotational speed that varies between when the contactor is in the open state and when the contactor is in a closed state.

5. The rotating electrical machine control device according to claim 4, wherein
the switching rotational speed is higher when the contactor is in the open state than when the contactor is in the closed state.

6. The rotating electrical machine control device according to claim 5, wherein
the first DC power supply is a chargeable power supply device,
when the contactor is in the closed state, the switching rotational speed is a rotational speed at which regenerative power according to the rotational speed of the rotating electrical machine and a charging current flowing through the first DC power supply are smaller than their maximum allowable rated values according to a voltage of the first DC power supply, and
when the contactor is in the open state, the switching rotational speed is a rotational speed at which a peak value of a line counter electromotive force of the alternating current of the plurality of phases is smaller than a maximum allowable rated voltage of the rotating electrical machine drive device.

7. The rotating electrical machine control device according to claim 6, wherein
when the rotational speed of the rotating electrical machine increases to the high rotational speed region during the shutdown control, the fail-safe control is switched to the active short-circuit control, and when the rotational speed of the rotating electrical machine decreases to the low rotational speed region during the active short-circuit control, the fail-safe control is switched to the shutdown control.

8. The rotating electrical machine control device according to claim 7, further comprising:
a plurality of control signal drive circuits that enhance switching control signals, which are generated by the electronic control unit to control the switching elements, and relay the resultant switching control signals, wherein
electric power from a power supply that uses the first DC power supply as the power source of the power supply is supplied to at least one of the control signal drive circuits in the upper stage which relay the switching control signals to the upper stage switching elements and the control signal drive circuits in the lower stage which relay the switching control signals to the lower stage switching elements.

* * * * *